United States Patent

[11] 3,584,729

| [72] | Inventor | Joe G. Ivy<br>Hinsdale, Ill. |
|---|---|---|
| [21] | Appl. No. | 821,374 |
| [22] | Filed | May 2, 1969 |
| [45] | Patented | June 15, 1971 |
| [73] | Assignee | Westinghouse Electric Corporation<br>Pittsburgh, Pa. |

[54] METHOD AND APPARATUS FOR DIVIDING FLOW OF HETEROGENEOUS MATERIALS
6 Claims, 4 Drawing Figs.

[52] U.S. Cl. ...................................... 198/165,
198/185, 222/55
[51] Int. Cl. ......................................B65g 15/14,
B65g 15/28, B67d 5/08
[50] Field of Search............................................198/75, 78,
81, 185, 165; 222/55

[56] References Cited
UNITED STATES PATENTS
| 2,737,997 | 3/1956 | Himmelheber | 222/55X |
| 2,822,028 | 2/1958 | Himmelheber | 222/55X |

*Primary Examiner*—Edward A. Sroka
*Attorneys*—F. H. Henson, R. G. Brodahl and C. J. Paznokas ABSTRACT: Heterogeneous materials are divided into separate flows of predetermined volumetric flow rate by means of systems comprising conveyor belts that are adjustably located. One disclosed system involves using an adjustably located conveyor belt with a substantially vertical working face set diagonally across the path of a horizontally extending conveyor belt and spaced therefrom, to deflect to an adjacent and parallel horizontally extending conveyor belt the heterogeneous material not passing thereunder. A second system uses adjustably located conveyor belts to divide a band of heterogeneous material advancing on a horizontally extending conveyor belt into a number of substantially equal portions.

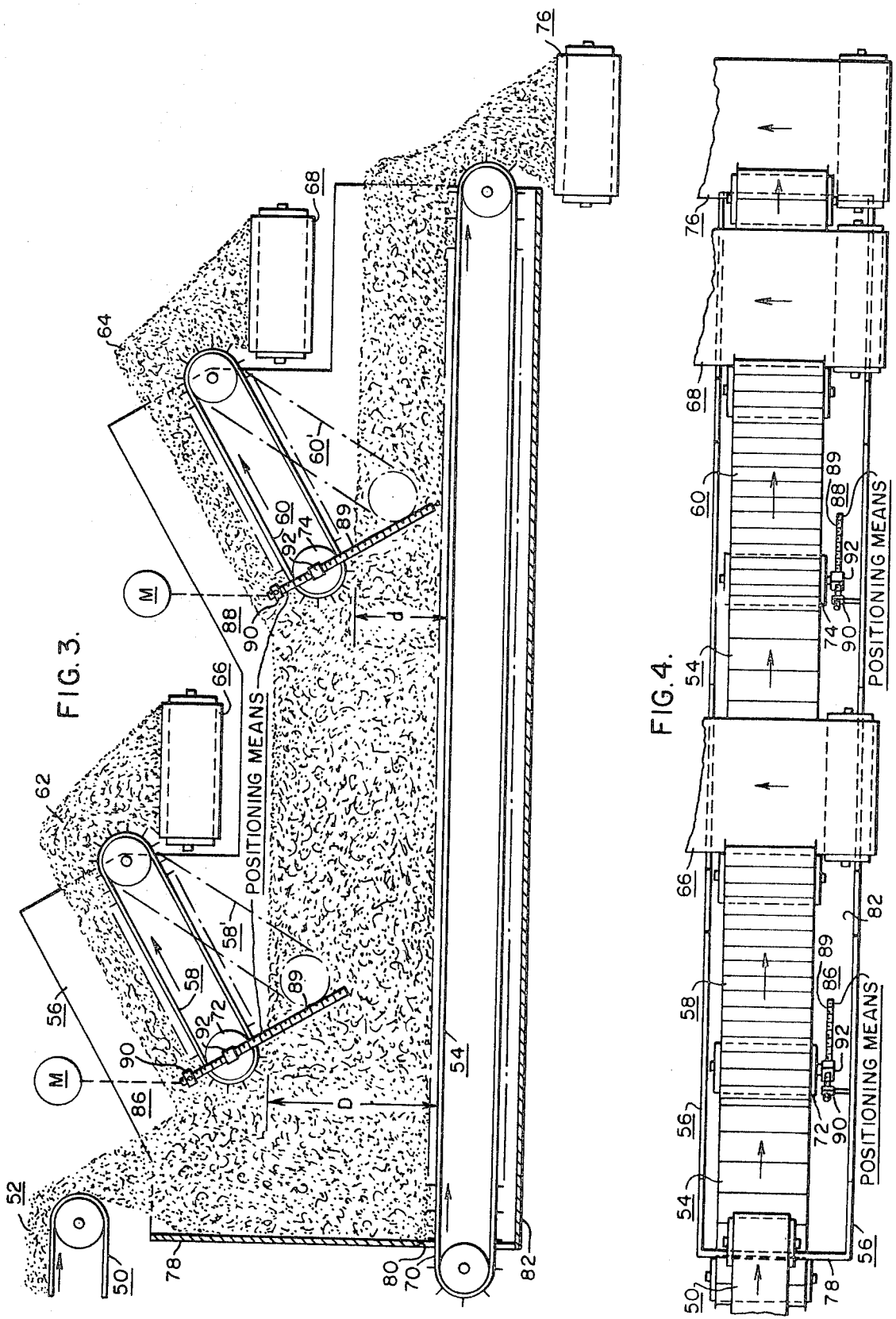

METHOD AND APPARATUS FOR DIVIDING FLOW OF HETEROGENEOUS MATERIALS

BACKGROUND OF THE INVENTION

1. Field of the Invention

This invention relates to methods and apparatus for conveying and dividing heterogeneous materials, and in particular, to conveyor-belt systems and the like.

2. Description of the Prior Art

In the processing of refuse, heterogeneous material as received from, for example, a number of garbage trucks, is dumped onto a belt-type conveyor and is subsequently to be processed by being passed through one or more picker lines. In a picker line, the heterogeneous material, comprising rags, string, cans, bottles, leaves, papers, and other garbage and trash, is passed along the conveyor belt where a sorting thereof is done in order that the various components of the heterogeneous material may be salvaged. In a refuse-processing plant of such size as to contain a substantial number of such picker lines, problems are encountered in distributing satisfactorily to the several lines the heterogeneous material as it is received. Usually, the material is received at a rate that may vary between rather wide limits; for example, the volume in one hour may be three times that in the previous hour.

It is desirable that the heterogeneous material be handled quickly, without being allowed to sit and that the plant be sized to handle the required maximum capacity.

SUMMARY OF THE INVENTION

The foregoing problems are overcome by using a system in which heterogeneous material on a main or feed conveyor is divided into separate volumetric flows by the use of other conveyors that have belts that are adjustably located with respect to the working surface of the main or feed conveyor. In one system, a conveyor belt with a vertical working face is set diagonally with respect to the feed conveyor, to deflect to and adjacent parallel conveyor any heterogeneous material that does not pass under the conveyor with the vertical working face. In another system, heterogeneous material in a bed on a feed conveyor is divided into a number of equal volumetric flows by the use of a number of conveyors, each having an end that is located adjustably with respect to the bed of the feed conveyor.

DESCRIPTION OF THE DRAWINGS

A complete understanding of the invention may be obtained from the foregoing and following description thereof, taken together with the appended drawings, in which:

FIG. 3 is a schematic elevation view of equipment in accordance with a second embodiment of the invention; and FIG. 4 is a plan view corresponding to FIG. 3.

DESCRIPTION OF THE PREFERRED EMBODIMENTS

Figure 1:
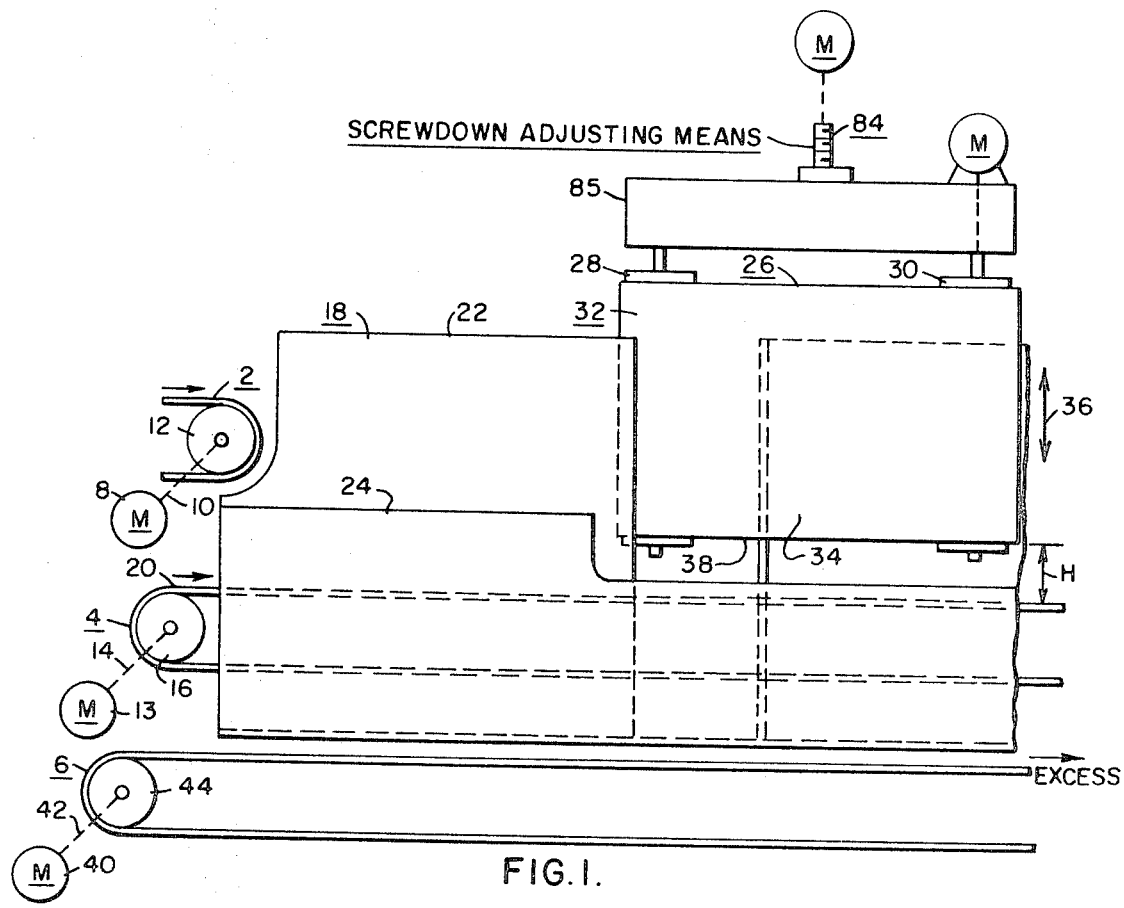
FIG. 1 is a schematic elevation view of one embodiment of the invention.
Figure 2:
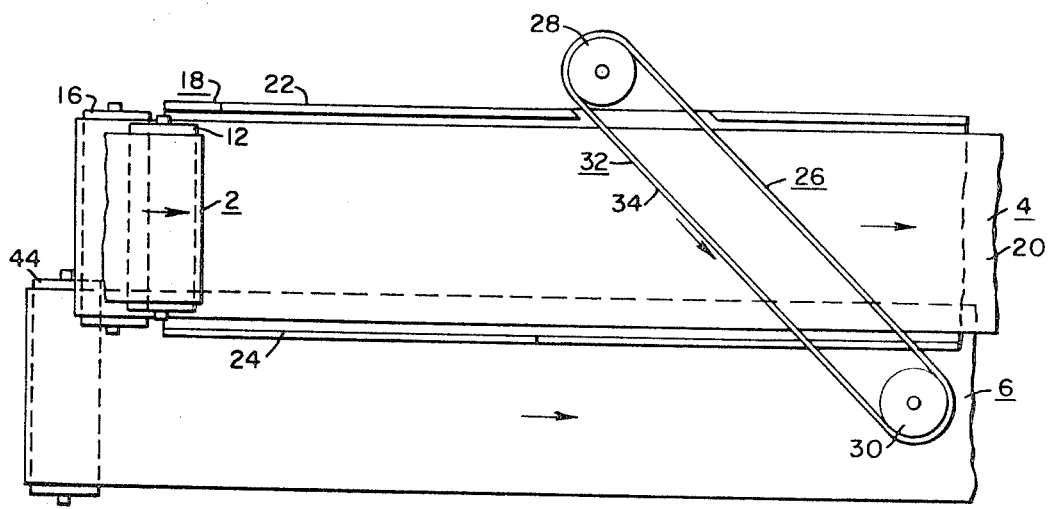
FIG. 2 is a plan view corresponding to FIG. 1.

Referring to FIGS. 1 and 2, there is shown schematically an embodiment of the invention comprising a first conveyor 2 by means of which heterogeneous material is fed to the system, a second conveyor 4 by means of which a volumetric flow of desired magnitude is withdrawn from the system, and a third conveyor 6 that serves to carry away the excess, if any, of heterogeneous material beyond the predetermined amount to be taken by the conveyor 4. Conveyors 2, 4, and 6 are shown as belt-type conveyors. Belt-type conveyors may have continuous or slatted, or other type of conveying surface on an endless chain or belt.

Associated with the conveyor 2 is a motor 8, which is operatively connected as at 10 with one of the pulleys 12 of the conveyor 2. Preferably, the motor 8 or the operative connection 10 is of such nature that the speed of operation of the conveyor 2 may be varied to suit requirements.

Associated with the conveyor 4 is a motor 13, operatively connected as at 14 with one of the pulleys 16 of the conveyor 4. Again, it is preferable that the motor 13 or its operative connection 14 with the conveyor 4 be such that the speed of the conveyor 4 may be varied to suit requirements. It is also preferable that the conveyor 4 be provided with a skirt 18 sufficiently high to prevent material from falling from the sides thereof. Of course, if the belt 20 of the conveyor 4 is sufficiently wide and the quantity of heterogeneous material to be worked with is sufficiently small, a skirt may not be necessary, but in most instances, one will be used because of its contribution to the compactness and capacity of the apparatus. In a preferred form, the skirt 18 is generally U-shaped, having one side or leg 22, on the side of the belt 20 away from the conveyor 6, substantially higher than the side or leg 24 that is between the conveyor 4 and the conveyor 6. The reason is that, though the falling of heterogeneous material from the conveyor 4 onto the conveyor 6 can be tolerated, the loss of heterogeneous material from the other side of the conveyor 4 cannot. It is desirable, moreover, that a leg 24 of the skirt 18 project about the working surface of the belt 20 by a height sufficient to retain on the belt 20 in the vicinity thereof next to the leg 24 sufficient material to fill substantially the space above the belt 20 that is under the deflector means 26.

The deflector means 26 comprises a pair of pulleys 28, 30 that are rotated about vertical axes by means not shown and have passed about them an endless belt 32 having a vertical working face 34 that is angularly disposed with respect to the path of travel of material on the belt 20. Moreover, the endless belt 32, alone or with the pulleys 28, 30, is arranged to be adjustable vertically, as indicated by the arrow 36, so as to leave a space $H$ between the bottom edge 38 of the belt 32 and the top of the belt 20. The edge 38 thus comprises an operative portion of the deflector means 26. The deflector means 26 operates to pass beneath it, on the belt 20, a volumetric flow of $WHV$ cubic feet per minute, where $W$ is the width of the belt 20 in feet, $H$ is the above-indicated dimension in feet, and $V$ is the velocity of the belt 20 in feet per second. By the action of the deflector means 26, excess material is diverted to they conveyor 6, which has associated with it a motor 40, operatively connected as at 42 with one of the pulleys 44 of the conveyor 6.

The means for changing the height $H$ have not been shown in detail, as various expedients for this purpose will suggest themselves to those skilled in the art. It is known, for example, how to arrange the pulleys 28, 30 and belt 32 for physical movement up and down. Another possibility is that the position of a belt on a pair of pulleys may be influenced by the use of auxiliary rolls that may be canted to move the belt axially with respect to the pulleys about which it turns; indeed, even where a belt might otherwise be kept tracking satisfactorily with the use of side flanges on the pulleys, it may be preferable to use such auxiliary rolls to avoid excess wear on the edges of the belt.

Another possible modification, not illustrated, comprises the use of a plurality of deflector means such as the deflector means 26, so that material that has been passed by a first deflector means is later deflected by a second deflector means onto another conveyor belt, either on the same side of the conveyor belt 4 or on the opposite side, as desired.

Referring now to FIGS. 3 and 4, there is shown schematically another embodiment of the invention, in accordance with which heterogeneous material is divided into a number of separate flow streams using a plurality of adjustably located conveyor belts. There is a main feed conveyor 50, from which heterogeneous material 52 is spilled on a receiving conveyor 54 provided with shaped skirts 56. Running parallel to the conveyor 54, there are belt conveyors 58 and 60 which raise the material, as at 62 and 64, respectively, for discharge onto other conveyors 66 and 68, respectively. The conveyors 66 and 68 run transversely to the conveyor 54. Conveyors 58 and 60 have clearances $D$ and $d$, respectively, from the face 70 of the conveyor 54. Thus, the volumetric flow rate of the material passing the bottom adjustably the conveyor 58 is $DWV$ cubic feet per hour, where $D$ is the above-mentioned dimension in feet, and $W$ and $V$ have the significance indicated above. Similarly, the volumetric flow rate of material passing under the conveyor 60 is $dWV$ cubic feet per hour. In accordance with the invention, means are provided for adjusting the location of the bottom pulleys 72 and 74, respectively, of the conveyors 58 and 60. This is indicated in the drawings by the showing in dash-dot outline of the conveyors 58 and 60 in an alternative position, designated by the numerals 58' and 60'. Material leaving the end of the conveyor 54 is similarly transferred to a conveyor 76. It can be seen that the conveyors 66, 68 and 76 extend along parallel paths and may be used, when the conveyors 58 and 60 are appropriately adjusted, to divide the incoming flow of the conveyor 52 into approximately equal proportion or, when the flow on the conveyor 52 is exceedingly variable, to confine the variations experienced substantially to the output on the conveyor belt 66. Conveyors 50, 54, 58, 60, 66, 68, and 76 are shown as belt-type conveyors, and are driven by suitable motor drives (not shown).

A backwall or skirt section 78 connects the "twin" skirts 56 located on opposite sides of conveyor 54. The lower end 80 of the skirt section 78 terminates above conveyor 54 to provide clearance for that conveyor. While both similarly contoured skirts 56 are shown in FIG. 4, only one is shown in FIG. 3 in order to "open" the structure to view the interior.

It should be understood that to some extent the illustrations are diagrammatic and symbolic in nature and that some dimensional relations are exaggerated for more convenient and clearer illustration. For example the retaining skirts 56 would be disposed closer to the sides of the conveyors to minimize fall out. Also more clearance would be provided between the bottom section 82 and the conveyor 54.

Motor driven screw-type adjusting or positioning mechanisms are shown diagrammatically at 84 (FIG. 1) and 86 and 88 (FIGS. 3 and 4) to illustrate that the positions of deflector 26 and of the belt pulleys 72 and 74 are adjustable in order to change the dimensions $H$ (FIG. 1) and $D$ and $d$ (FIG. 3) as desired. Mechanism 84 imparts vertical drive as desired to a supporting structure 85 which supports pulleys 28 and 30 and the motor drive therefor. In each of the mechanisms 86 and 88 a threaded rod or lead screw 89 may freely turn in a pivoted bearing 90 and drive a threaded "nut" member 92 pivotally coupled to the belt pulley.

While I have shown and described herein certain embodiments of my invention, I intend to cover as well any change or modification therein which may be made without departing from its spirit and scope.

I claim as my invention:

1. Apparatus for dividing an incoming flow of heterogeneous refuse-type material into portions, at least one of said portions being of predetermined volumetric flow rate, said apparatus comprising:

first conveyor means for conveying said incoming flow, belt-type second conveyor means for receiving and removing a predetermined volumetric flow portion of said incoming flow, a deflector means in the path of travel of material on said second conveyor means and spaced above said second conveyor means for deflecting from said second conveyor means incoming material that is in excess of said predetermined volumetric flow rate, said deflector means comprising an endless belt and a pair of spaced pulley devices around which said belt passes, means for causing rotation of at least one of said pulley devices to cause movement of said belt about said pulley devices, the direction of movement of said belt being such as to cause material deflected by said deflector means to travel forwardly with the material on said second conveyor means but along a substantially straight-line path of travel which is at an angle to the direction of movement of material on said second conveyor means whereby movement of the deflected material does not substantially oppose movement of material on said second conveyor means, and means for adjusting the spacing between said second conveyor means and said deflector means.

2. Apparatus as defined in claim 8, further characterized in that said second conveyor means is provided upstream of and in the vicinity of said deflector means with skirt portions that confine said heterogeneous material thereon to a bed of depth of at least equaling said distance between said operative portions of said deflector means and said second conveyor means and prevent any substantial portion of said heterogeneous material in said incoming flow from becoming unconveyed.

3. Apparatus as defined in claim 8, further characterized in that said deflector means comprises a pair of pulleys arranged for rotation about parallel and substantially vertical axes, and an endless belt extending between and in engagement with said pulleys, said endless belt having a substantially vertical working face arranged at an oblique angle with respect to the center line of said second conveyor means.

4. Apparatus as defined in claim 3, further characterized in that said second conveyor means is provided upstream of and in the vicinity of said deflector means with skirt portions that confine said heterogeneous material to a bed of depth of at least equaling said distance between said operative portions of said deflector means and said second conveyor means and prevent any substantial portion of said heterogeneous material in said incoming flow from becoming unconveyed.

5. Apparatus as defined in claim 8, further characterized in that said deflector means comprises belt-type third and fourth belt conveyor means, each having an operative portion that is capable of being adjusted with respect to its distance from said second conveyor means, said third conveyor means being located upstream of said fourth conveyor means with respect to the direction of flow of material on said second conveyor means, and the distance between the operative portion of said third conveyor means and said second conveyor means being greater than the distance between the operative portion of said fourth conveyor means and said second conveyor means, said third and fourth conveyor means each having a width substantially that of said second conveyor means and running in a path vertically in alignment with said second conveyor means, said second conveyor means being provided with skirt portions that restrain in a conveyed condition substantially all of said incoming flow of heterogeneous material.

6. Apparatus as defined in claim 5, further characterized by fifth, sixth, and seventh conveyor means extending in paths generally parallel to one another and transversely to said second belt conveyor means, said fifth, sixth and seventh conveyor means receiving, respectively, the substantially entire flow discharged from said third, fourth and second conveyor means.